March 9, 1926.  
J. E. BRYERS  
1,576,304  
METHOD OF AND APPARATUS FOR MAKING IMPLEMENT SOCKETS  
Filed Jan. 10, 1921  2 Sheets-Sheet 1

INVENTOR  
John E. Bryers,  
By Bakr & Macklin,  
ATTORNEYS

March 9, 1926.
J. E. BRYERS
1,576,304
METHOD OF AND APPARATUS FOR MAKING IMPLEMENT SOCKETS
Filed Jan. 10, 1921
2 Sheets-Sheet 2

INVENTOR
John E. Bryers,
BY Baker & Macklin,
ATTORNEYS

Patented Mar. 9, 1926.

1,576,304

UNITED STATES PATENT OFFICE.

JOHN E. BRYERS, OF JACKSON, MICHIGAN, ASSIGNOR TO THE AMERICAN FORK & HOE COMPANY, OF CLEVELAND, OHIO, A CORPORATION OF OHIO.

METHOD OF AND APPARATUS FOR MAKING IMPLEMENT SOCKETS.

Application filed January 10, 1921. Serial No. 436,078.

*To all whom it may concern:*

Be it known that I, JOHN E. BRYERS, a citizen of the United States, residing at Jackson, in the county of Jackson and State of Michigan, have invented a certain new and useful Improvement in Methods of and Apparatus for Making Implement Sockets, of which the following is a full, clear, and exact description, reference being had to the accompanying drawings.

This invention relates to the manufacture of implements having seamless sockets formed integral therewith. Heretofore it has been customary, in the manufacture of agricultural tools for instance, to form a shank with an enlarged flattened portion which was thereafter bent into an open socket form and welded at the meeting edges. Such method of manufacture has been comparatively expensive, and the tool produced has had the disadvantage that the socket sometimes broke apart at the weld.

In my invention I take a blank having an enlarged shank portion, and by successive rolling, draw such shank over a mandrel to make a seamless socket. The method of manufacture is cheap and the result produced is highly desirable.

My improved method will be hereinafter more fully explained in connection with the drawings, which illustrate the article in various stages, and mechanism which may be employed in the forming and rolling operations.

Figure 1:
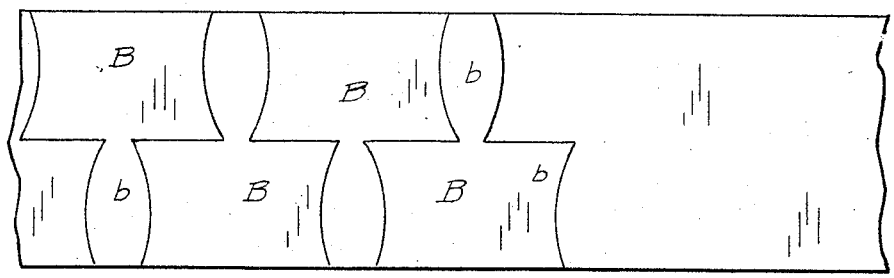
Figure 2:
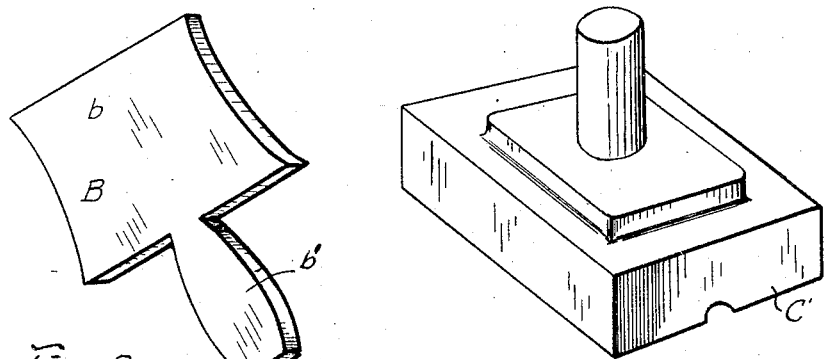
Figure 3:
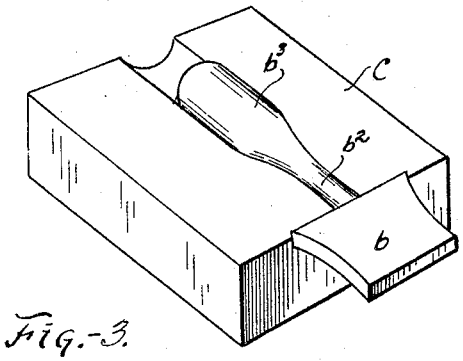
Figure 4:
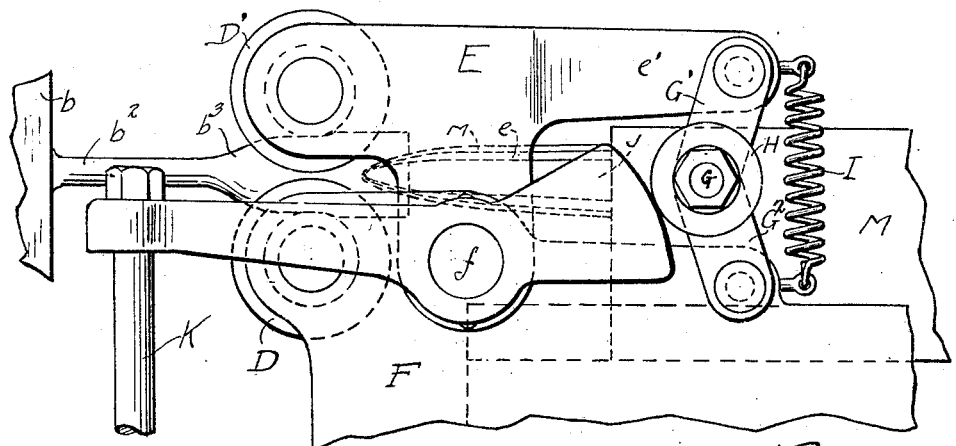
Figure 5:
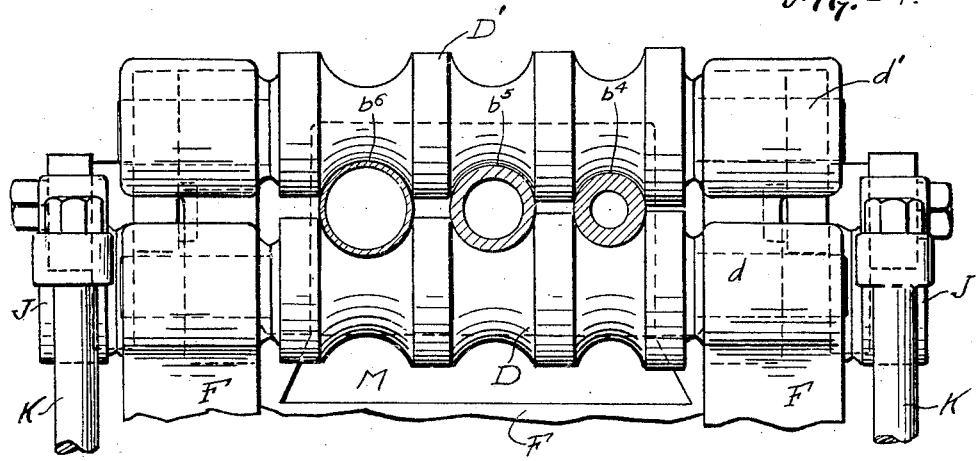
Figure 6:
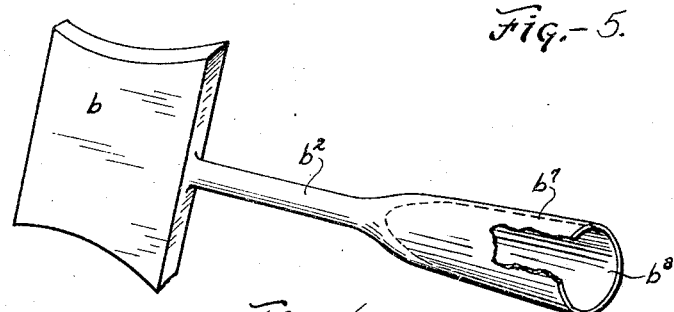

In the drawings, Fig. 1 is a plan of a piece of flat bar stock from which blanks of the form indicated may be cut; Fig. 2 is a perspective of one of such blanks; Fig. 3 is a perspective of a pair of dies for forming the shank and enlarged head portion adapted to become the socket; Fig. 4 is a side elevation of a rolling mechanism to force the enlarged head of the shank longitudinally over a mandrel; Fig 5 is a front view of the mechanism shown in Fig. 4, the socket in various stages being illustrated in cross section; Fig. 6 is a perspective, partly broken away, illustrating the completed socket.

In carrying out my method, I first take a strip of bar stock, indicated at A in Fig. 1, and punch from this suitable blanks B, each blank having a body portion $b$ and a shank portion $b'$. The edges of the body portion and the shank portion are formed complementarily so that by locating the blanks alternately toward the right and left edges of the strip there need be no waste material. Fig. 2 shows the blank B as cut from the strip A. This particular blank is designed to form a hoe, but it will readily be seen the invention is adapted for other tools, the body portion of the blank being varied accordingly.

After forming the blank, as illustrated in Fig. 2, the next step is to forge the shank by hammering or dies into a round bottle-shaped form. There may be several operations to cause the shank to take this form, the final form at this stage being illustrated by the cylindrical shank proper $b^2$ and the enlarged round head $b^3$ in Fig. 3. C and C'' in Fig. 3 illustrate a pair of dies for finally giving the shank the form shown in that figure.

The next step in my process is to roll the round head $b^3$ lengthwise away from the tool body $b$ and over a mandrel, several successive rollings being desirable to effect this operation. Figs. 4 and 5 show, by way of example, a suitable mechanism for accomplishing this. In these figures D and D' represent a pair of co-operating rolls having several passes of successively enlarged sizes. The roll D is shown as having gudgeons $d$ mounted in stationary bearings in a main frame F. The roll D' has gudgeons $d'$ mounted in an oscillating frame E. This oscillating frame is illustrated as having depending side portions $e$ which are pivoted on studs $f$ projecting from the stationary frame F.

The oscillating frame E has rear extensions $e'$ each connected with the stationary frame by a pair of toggle links $G'$, $G^2$ pivoted respectively to the main frame and the oscillating frame and pivoted to each other at G. Around the pivot pins $g$ are shown rollers H, and against these rollers bear the cam ends of levers J, pivoted on the studs $f$ and having suitable operating rods K, which may be connected with a treadle, not shown. Suitable means, as a spring I connected to the stationary frame and the oscillating frame, tends to separate the rolls; the cam levers J, on the other hand, by bearing against the rollers H provide powerful means for bringing the rolls together.

Slidably mounted on the stationary frame F is a slidable cross head M, having projecting from it a series of horns or mandrels $m$, there being one mandrel for each pass of the rolls. Each mandrel has its axis aligned with the center of the corresponding pass.

With some such apparatus as above outlined, the tool having the headed shank, as shown in Fig. 3, is placed in the smallest pass of the rolls, the rolls being separated to allow such positioning and the head on the shank being at the rear of the rolls and against the point of the mandrel $m$. Then the rolls are brought together by the operation of the toggle mechanism, above described, and the slide M is moved forwardly by suitable powerful mechanism to shove the blank forwardly thru the now constricted pass. In this operation the mandrel, to some extent, enters the end of the shank head and the material of the shank head is rolled rearwardly over the point of the mandrel producing a structure which, adjacent to the end of the blank, has a form indicated by the cross section $b^4$ in Fig. 5.

Now the rolls are again separated and the partially formed blank is placed in the second pass and the rolls brought together and the mandrel for that pass caused to shove the blank thru the rolls, thus further thinning the material of the shank head and forcing it farther back on the mandrel, lengthening the socket portion and enlarging its hole as shown at $b^5$ in Fig. 5.

The operation described is continued for as many successive passes as desired. These successive passes are preferably each larger than the preceding one and the successive mandrels are also increased in size, the result being that the material is not only continuously rolled lengthwise over the mandrel, but circumferentially stretched. There may also, if desired, be two or more rollings through each pass, the size of the pass being changed as desired by the operation of the foot treadle or other means acting to position the oscillating frame. In the final pass the socket portion becomes quite thin and is rolled well back onto the mandrel, thus taking the form illustrated at $b^6$ in Fig. 5.

Fig. 6 illustrates at $b^7$ the completed seamless socket as produced by the operation described. In this final form the socket has the desired length and has been reduced to the thin wall desired, leaving the internal cavity $b^8$. This socket is seamless and connects integrally with the shank $b^3$ and for use only needs trimming off of the extreme end and the usual operations of grinding and polishing.

Fig. 6 shows the completed socket and shank formed with the head portion of the blank $b$ in its original form. This head portion may now be forged into whatever form desired, as for instance a hoe head, and the shank portion $b^2$ may be bent into the usual goose neck form, or any other form given according to the tool made. If desired, the head portion of the blank may be formed into its tool form before the socket is formed instead of afterwards, or the formation of the socket and the tool proper may go on in alternate steps. During the various forging operations it is to be understood the blank will be reheated at various stages as necessary.

My operation is comparatively simple and is cheaply carried out, and experience has demonstrated that it produces a seamless socket of great strength and neat appearance.

I claim:—

1. The method of making sockets for implements comprising rolling the end portion of a blank over the end of a rigidly held mandrel toward which the blank is pushed by rolls which have the same direction of travel at the lines of contact, and subsequently rolling such portion over a larger mandrel between rolls having a larger pass and having the same direction of travel at the lines of contact.

2. The method of making implement sockets comprising forming a blank with a body portion and a shank portion, then rounding the shank portion, then drawing the end of the shank portion by successive rollings through successively enlarged passes over successively enlarged tapered and pointed mandrels aligned with the passes, the rolling members on opposite sides of the blank having the same direction of travel at the lines of contact, which direction is parallel with the axis of the mandrel, the rollers first engaging the shank and forcing it over a posteriorly disposed mandrel.

3. The method of making implements having seamless sockets comprising cutting of a blank having a body portion and a shank portion, rounding the shank portion to make a shank proper and an enlarged solid head and then rolling the head lengthwise away from the body and over a mandrel disposed behind the roll mounted coaxially with the shank and head, the direction of travel of the contacts being longitudinal of the mandrel, the rollings being repeated several times and with successively enlarged mandrels.

4. The method of making implement sockets comprising cutting blanks from bar stock into a body and shank portion, forging the shank portion into a round member having a neck and an enlarged solid head, and then by successive operations, forcing successively larger mandrels into the end of the enlarged head and at the same time rolling the material of the head lengthwise over the mandrel by rolls having successively larger passes, said rolls having their axes in a plane transverse to the mandrel and anterior thereto.

5. An apparatus for making implement sockets comprising a pair of cooperating rolls each having a successively enlarging series of grooves whereby a series of successively enlarged passes is provided and a series of mandrels held behind the passes and pointing toward them in such manner as to resist the thrust of the blank toward the mandrel, the mandrels being enlarged in the same order as the passes.

6. In an apparatus for making implement sockets, the combination of a pair of rolls having sets of cooperating grooves to form passes, said passes being successively enlarged, and successively enlarged and tapered mandrels rigidly mounted behind the rolls with their axes in alignment with the passes, and means for driving the rolls in such direction that the proximate portions of their surfaces move toward the mandrel.

7. In an apparatus for making implement sockets, the combination of a pair of rolls provided with successively enlarged cooperating grooves, a movable frame carrying one of the rolls, means for moving said frame to adjust the approach of the rolls, and a series of mandrels rigidly carried behind the respective passes and pointing toward them.

8. An apparatus for making implement sockets comprising a pair of cooperating rolls with successively enlarged passes, a series of successively enlarged mandrels entirely behind the passes of the rolls and registered with them respectively, and means for driving the opposed rolls in the contrary direction of rotation so that the adjacent portions of their surfaces will move in the same direction and toward the mandrels.

In testimony whereof, I hereunto affix my signature.

JOHN E. BRYERS.